United States Patent
Rittershofer et al.

(10) Patent No.: US 11,589,506 B2
(45) Date of Patent: Feb. 28, 2023

(54) RESIDUE MANAGEMENT SYSTEM WITH ANTI-STAGNATION FLOOR EXTENSION

(71) Applicant: DEERE & COMPANY, Moline, IL (US)

(72) Inventors: Martin Rittershofer, East Moline, IL (US); Christopher J. Faulkner, East Moline, IL (US); Myles W. Zirpel, Eldridge, IA (US)

(73) Assignee: Deere & Company, Moline, IL (US)

( * ) Notice: Subject to any disclaimer, the term of this patent is extended or adjusted under 35 U.S.C. 154(b) by 429 days.

(21) Appl. No.: 16/863,009

(22) Filed: Apr. 30, 2020

(65) Prior Publication Data

US 2021/0337730 A1    Nov. 4, 2021

(51) Int. Cl.
A01D 41/12     (2006.01)
A01F 29/04     (2006.01)

(52) U.S. Cl.
CPC .......... *A01D 41/1243* (2013.01); *A01F 29/04* (2013.01)

(58) Field of Classification Search
CPC .... A01D 41/1243; A01D 41/02; A01D 41/12; A01D 82/00; A01F 29/04; A01F 12/40
See application file for complete search history.

(56) References Cited

U.S. PATENT DOCUMENTS

| | | | |
|---|---|---|---|
| 5,976,011 A * | 11/1999 | Hartman | A01F 12/40 460/111 |
| 6,251,009 B1 | 6/2001 | Grywacheski et al. | |
| 6,736,721 B2 * | 5/2004 | Niermann | A01D 41/1243 460/112 |
| 6,939,221 B1 * | 9/2005 | Redekop | A01D 41/1243 460/111 |
| 7,331,855 B2 | 2/2008 | Johnson et al. | |
| 7,553,227 B2 * | 6/2009 | Landuyt | A01D 41/1243 460/111 |
| 7,927,200 B2 | 4/2011 | Van Overschelde et al. | |

(Continued)

FOREIGN PATENT DOCUMENTS

| | | | | |
|---|---|---|---|---|
| EP | 1461993 B1 | 12/2005 | | |
| EP | 1842415 A1 * | 10/2007 | ......... | A01D 41/1243 |

(Continued)

OTHER PUBLICATIONS

Image of Fendt Combine Straw Deflector Chopper Bottom Ramp Assembly (1 page) (admitted prior art on or before Apr. 24, 2024).

*Primary Examiner* — Arpad F Kovacs

(57) ABSTRACT

A residue management system comprises a chopper to chop crop residue, a residue spreader, and a floor extension. The residue spreader is mounted for pivotable movement relative to the chopper between a dispersal position to disperse crop residue and a windrow position to deposit crop residue in a windrow. The residue spreader comprises a first spreading device, a second spreading device, and a splitter positioned laterally between the first and second spreading devices to divide flow of crop residue therebetween. A floor of the chopper and a floor of the residue spreader are spaced apart from one another to define a gap. The floor extension projects rearwardly from the floor of the chopper partially over the floor of the residue spreader about the gap alongside the splitter to guide flow of crop residue from the chopper to the residue spreader.

17 Claims, 10 Drawing Sheets

(56) References Cited

U.S. PATENT DOCUMENTS

| | | |
|---|---|---|
| 8,029,347 B2 | 10/2011 | Pohlmann et al. |
| 2009/0111548 A1 | 4/2009 | Landuyt |
| 2010/0291983 A1* | 11/2010 | Weichholdt ........ A01D 41/1243 460/112 |
| 2010/0291984 A1* | 11/2010 | Pohimann .......... A01D 41/1243 460/112 |
| 2010/0291985 A1* | 11/2010 | Pohimann .......... A01D 41/1243 460/112 |
| 2016/0150727 A1* | 6/2016 | Mayerle ................ A01F 12/10 460/112 |
| 2017/0099771 A1* | 4/2017 | Linde ................ A01D 41/1243 |

FOREIGN PATENT DOCUMENTS

| | | | |
|---|---|---|---|
| EP | 3138383 A1 | 3/2017 | |
| EP | 3884762 A1 * | 9/2021 | ......... A01D 41/1243 |

\* cited by examiner

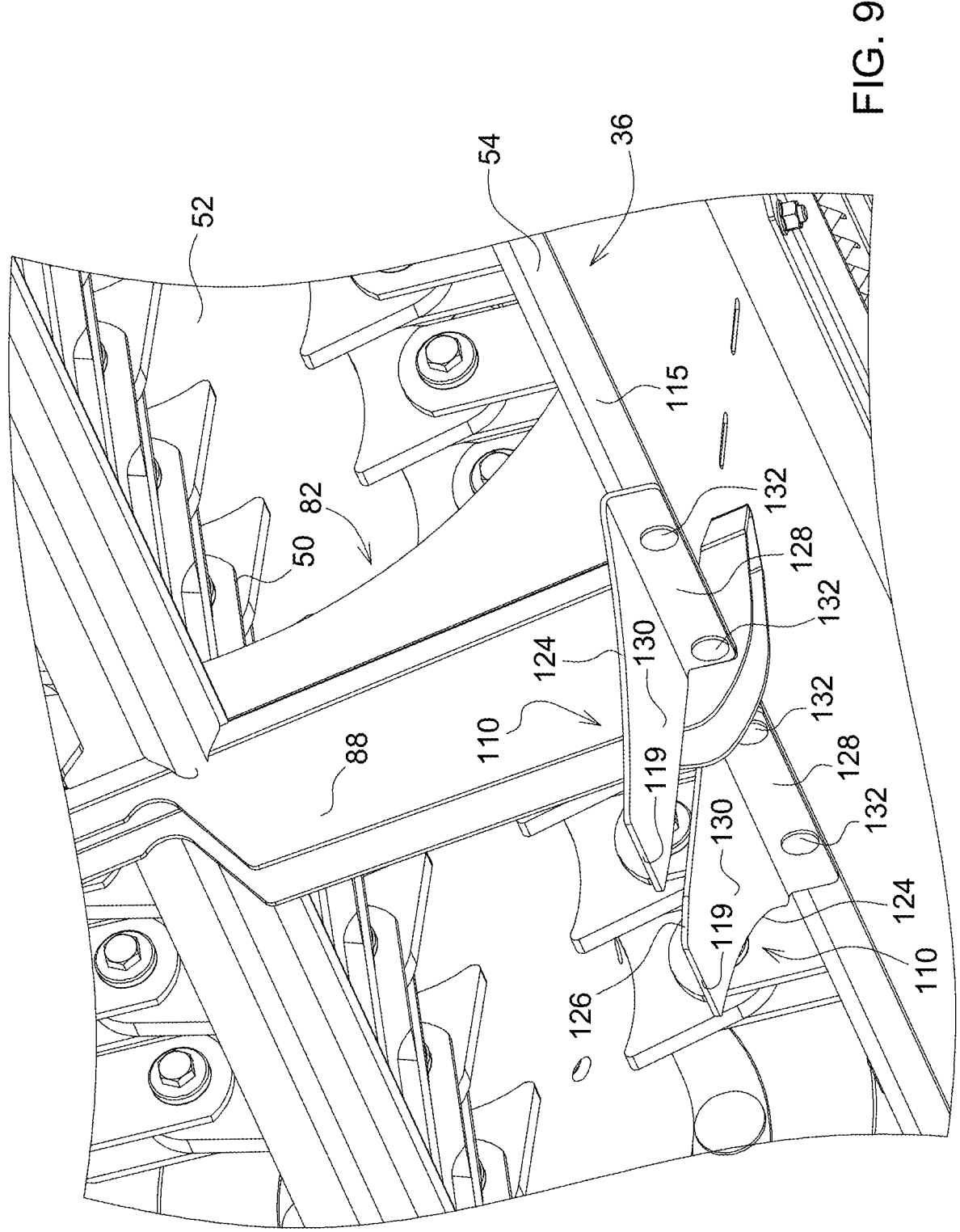

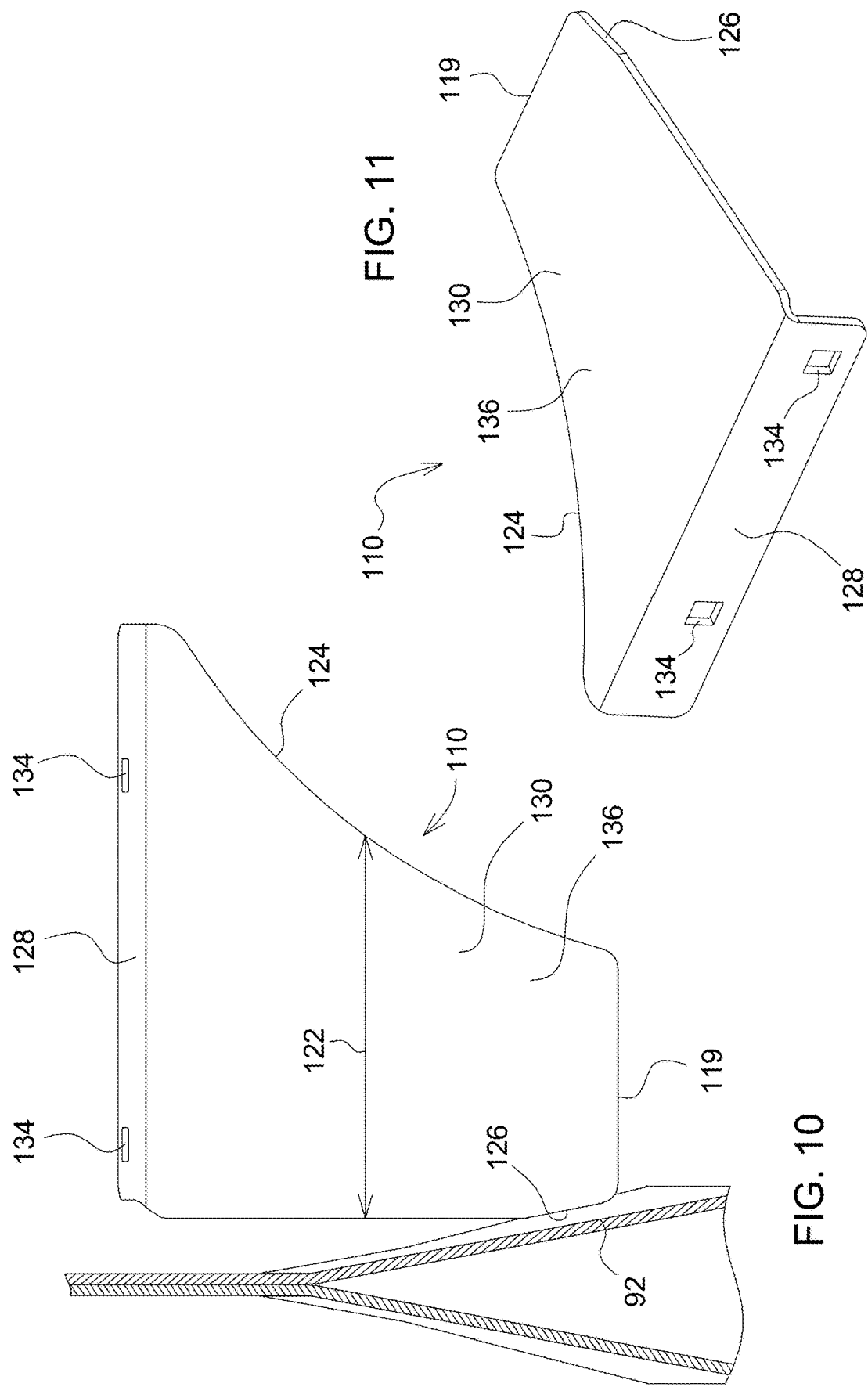

RESIDUE MANAGEMENT SYSTEM WITH ANTI-STAGNATION FLOOR EXTENSION

FIELD OF THE DISCLOSURE

The present disclosure relates to residue management systems for agricultural harvesters

BACKGROUND OF THE DISCLOSURE

Agricultural harvesters harvest crop from a field and process the harvested crop to separate grain from crop residue. Agricultural harvesters commonly have a residue management system for returning crop residue to the field.

SUMMARY OF THE DISCLOSURE

According to an aspect of the present disclosure, there is disclosed a residue management system for an agricultural harvester that moves in a forward direction of travel over a field to harvest crop. The residue management system comprises a chopper, a residue spreader, and a floor extension. The chopper is to chop crop residue derived from crop harvested from the field by the agricultural harvester. The residue spreader is mounted for pivotable movement relative to the chopper between a dispersal position to disperse crop residue received from the chopper onto the field and a windrow position to deposit crop residue received from the agricultural harvester onto the field in a windrow. The residue spreader comprises a first spreading device, a second spreading device, a splitter positioned laterally between the first spreading device and the second spreading device to divide flow of crop residue from the chopper between the first spreading device and the second spreading device, and a floor under the first spreading device and the second spreading device. A floor of the chopper and the floor of the residue spreader are spaced apart from one another to define a gap therebetween to facilitate pivotable movement of the residue spreader between the dispersal position and the windrow position. The floor extension projects rearwardly from the floor of the chopper partially over the floor of the residue spreader about the gap alongside the splitter to guide flow of crop residue from the chopper to the residue spreader. The floor extension may thereby help reduce potential stagnation of crop residue flow and corresponding crop residue build-up in the residue spreader during passage from the chopper to the residue spreader.

In some embodiments, the residue management system may comprise a second floor extension projecting rearwardly from the floor of the chopper partially over the floor of the residue spreader about the gap alongside the splitter to guide flow of crop residue from the chopper to the residue spreader. In such a case, the floor extension may be positioned on a first lateral side of the splitter, and the second floor extension may be positioned on an opposite, second lateral side of the splitter. The floor extensions may thereby help reduce potential stagnation of crop residue flow and corresponding crop residue build-up on opposite lateral sides of the splitter in the residue spreader.

The above and other features will become apparent from the following description and accompanying drawings.

BRIEF DESCRIPTION OF THE DRAWINGS

The detailed description of the drawings refers to the accompanying figures in which:

FIG. 9 is a rear perspective view showing the first and second floor extensions projecting rearwardly and mounted to the chopper floor;

FIG. 10 is a front perspective view showing the first floor extension, the second floor extension being a mirror image thereof; and FIG. 11 is a top view showing the first floor extension with a chamfered edge parallel to the adjacent lateral side of a transition portion of the rear splitter (shown in section), the second floor extension and its relationship to the opposite lateral side of the transition portion being a mirror image thereof.

DETAILED DESCRIPTION OF THE DRAWINGS

Figure 1:
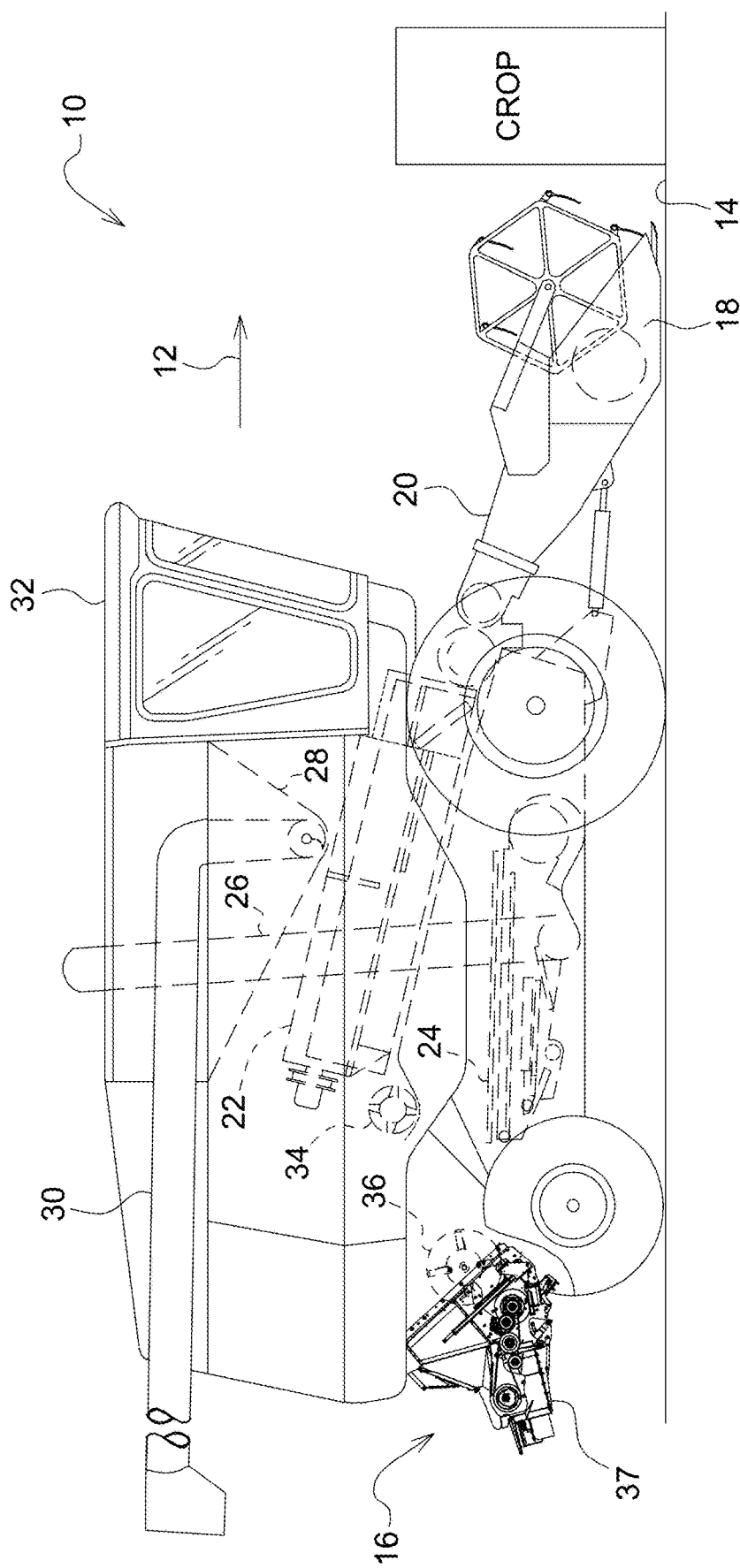
FIG. 1 is a side elevational view showing an agricultural harvester with a residue management system mounted at the rear of the agricultural harvester.

Referring to FIG. 1, an agricultural harvester 10 is configured to move in a forward direction of travel 12 over a field 14 to harvest crop from the field 14. The harvester 10 processes the crop, separating grain from crop residue (e.g., straw, stalks, cobs, leaves, chaff). The harvester 10 includes a residue management system 16 for returning crop residue, derived from harvested crop, back to the field 14.

In general, the harvester 10 may include an implement 18 to cut, gather, and transport crop rearwardly, a feederhouse 20 to advance crop received from the implement into the body of the harvester 10, a threshing and separating section 22 to thresh crop and further separate grain from crop residue, a cleaning section 24 including one more chaffers and sieves to separate grain from chaff or other relatively small pieces of crop material, a clean grain elevator 26 to elevate clean grain to a storage bin 28, an unloader 30 to unload clean grain to another location, and a beater to beat residue that is received from the threshing and separating section 22 and does not pass to the cleaning section 24 (e.g., straw, stalks, cobs, leaves). A person may control the harvester 10 from an operator's station 32 of the harvester 10. The harvester 10, including such portions thereof, may be configured in a wide variety of ways.

Referring to FIGS. 2-7, the residue management system 16 includes a chopper 36 and a residue spreader 37. The chopper 36 chops crop residue derived from crop harvested from the field 14 by the harvester 10. The residue spreader 37 is positioned rearward of the chopper 36. The residue spreader 37 is mounted for pivotable movement relative to the chopper 36 between a dispersal position (FIGS. 2-4) to disperse crop residue received from the chopper 36 onto the field 14, as indicated by arrow 38, and a windrow position (FIGS. 5-7) to deposit crop residue received over the residue spreader from the harvester onto the field 14 in a windrow, as indicated by arrow 39.

Figure 3:
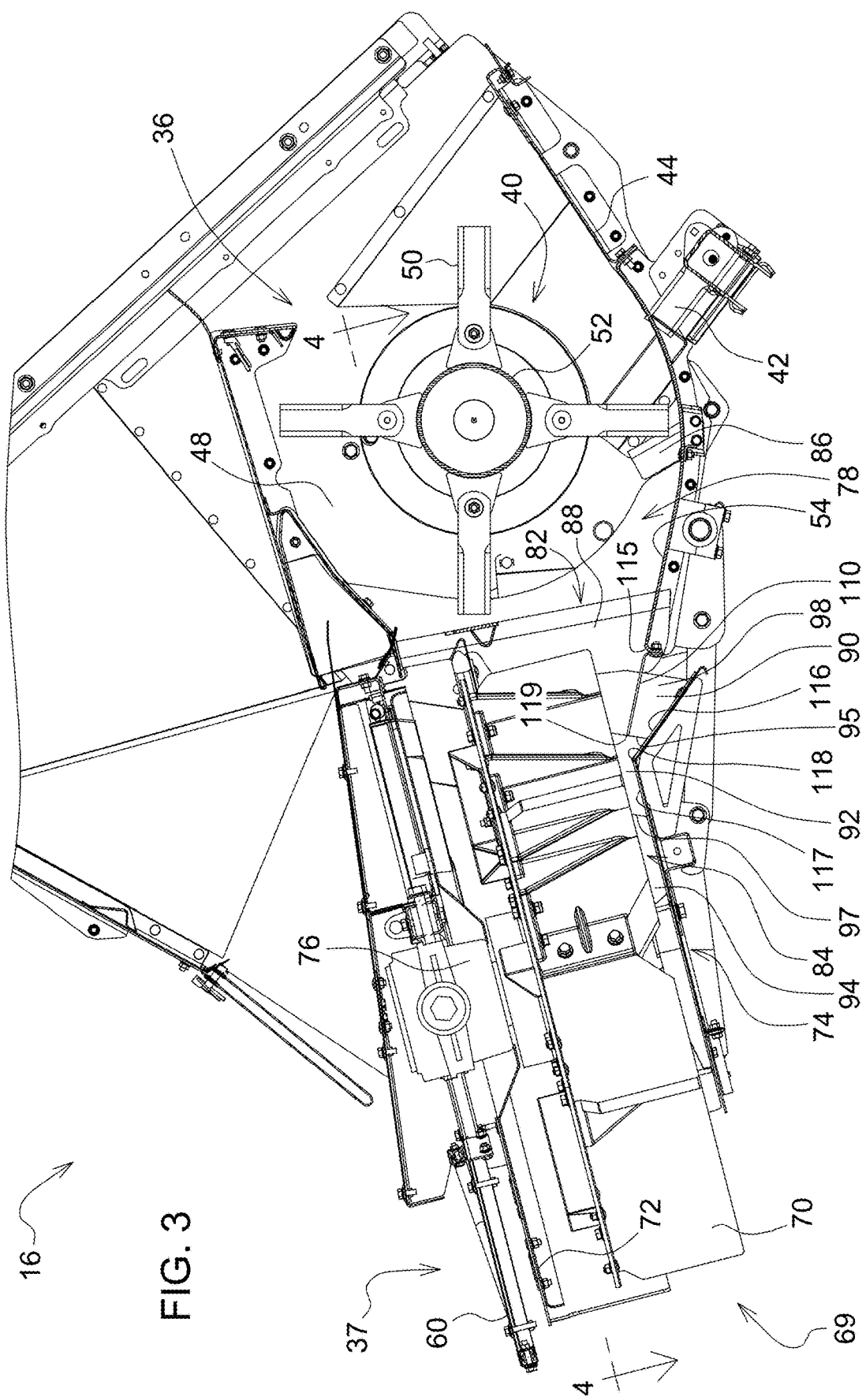
FIG. 3 is a sectional view, taken along lines 3-3 of FIG. 2, showing a first floor extension projecting rearwardly from a floor of the chopper with the residue spreader in the dispersal position, a second floor extension (not shown in FIG. 3) being a mirror image of the first floor extension.
Figure 6:
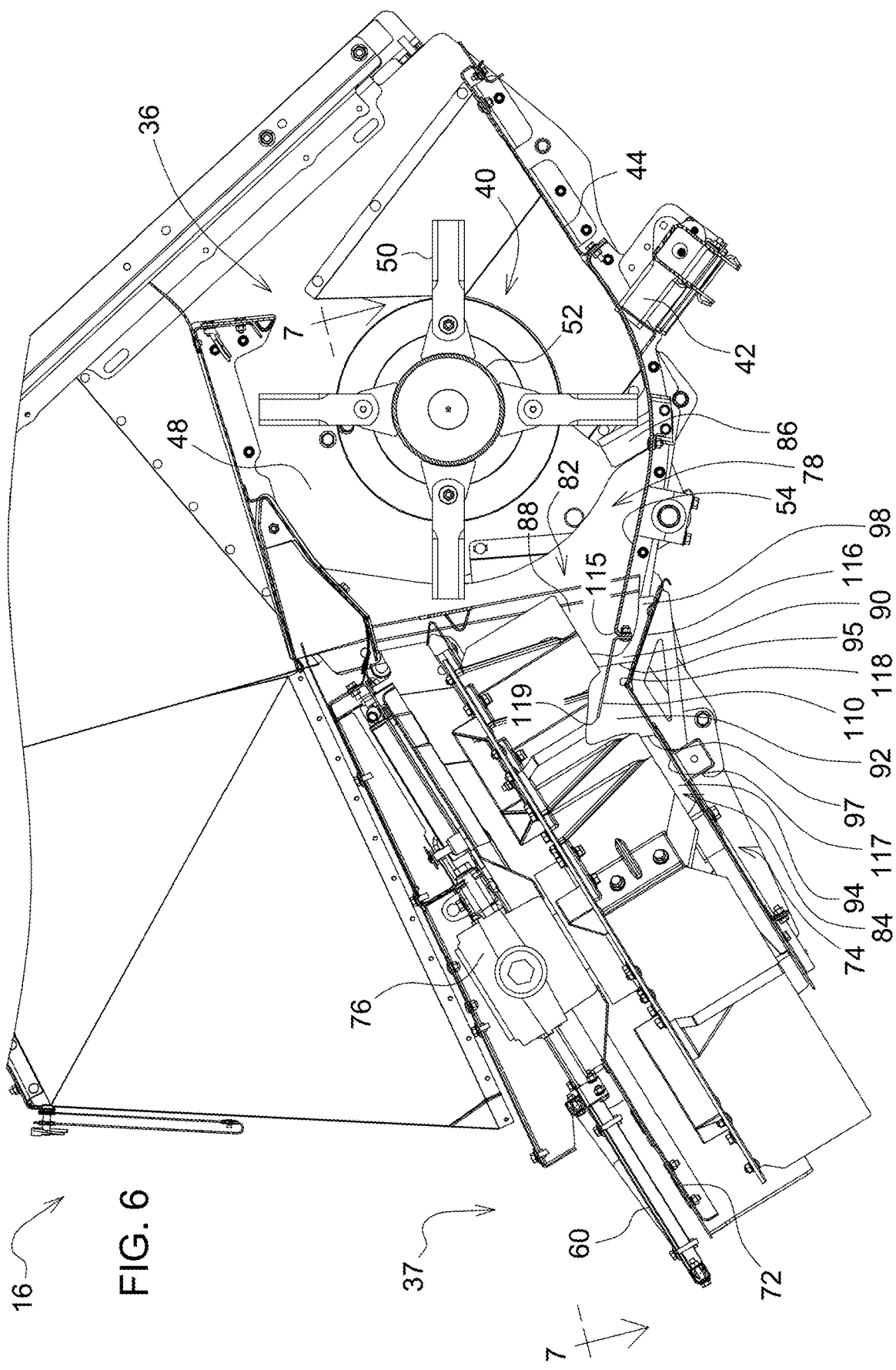
FIG. 6 is a sectional view, taken along lines 6-6 of FIG. 5, showing in side elevation the first floor extension projecting rearwardly from the chopper floor with the residue spreader in the windrow position, the second floor extension (not shown in FIG. 6) being a mirror image to the first floor extension.

Referring to FIGS. 3 and 6, the chopper 36 includes a flail rotor 40 and a set of counterknives 42. The flail rotor 40 is mounted to a frame 44 of the chopper 36 for rotation about an axis of rotation 46 in a chopping chamber 48 of the chopper 36. The flail rotor 40 includes flail blades 50 mounted about the periphery of a hub 52 of the flail rotor 40. The set of counterknives 42 can extend through corresponding slits in a floor 54 of the chopper 36. The extent to which the set of counterknives 42 extends out of the floor 54 into the chopping chamber 48 is adjustable depending, for example, on the type of crop being harvested and the level of chopping aggression desired. The flail blades 50 pass between the counterknives of the set of counterknives 42 to chop crop residue that enters the chopping chamber 48.

The chopper 36 may receive crop residue from the threshing and separating section 22 and from the cleaning section 24. A door of the harvester 10 is closed to direct crop residue from the threshing and separating section 24 and the beater 34 to the chopper 36 when the residue spreader 37 is positioned in the dispersal position. When the residue spreader 37 is positioned in the windrow position, the door is closed to direct crop residue from the threshing and separating section 22 and the beater 34 over the top 56 of the residue spreader 37 to deposit crop residue onto the field 14 in a windrow. The chopper 36 receives crop residue in the form of, for example, chaff from the cleaning section 24 regardless whether the residue spreader 37 is positioned in the dispersal position or the windrow position.

Figure 4:
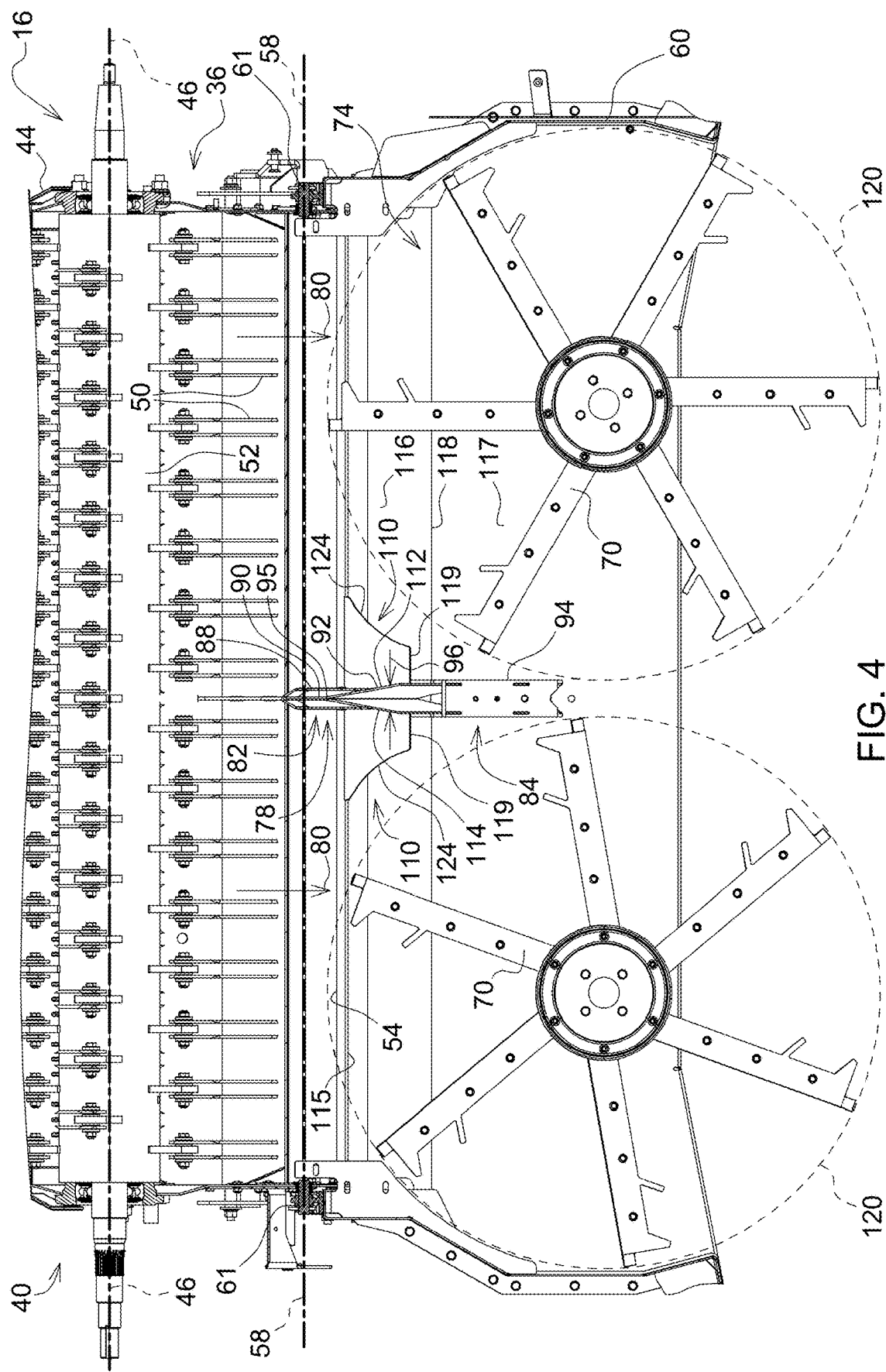
FIG. 4 is a top view, with portions broken away, showing the residue spreader in the dispersal position, the first floor extension positioned on a first lateral side (e.g., right side) of a rear splitter that divides flow of crop residue, and the second floor extension positioned on a second lateral side (e.g., left side) of the rear splitter.
Figure 5:
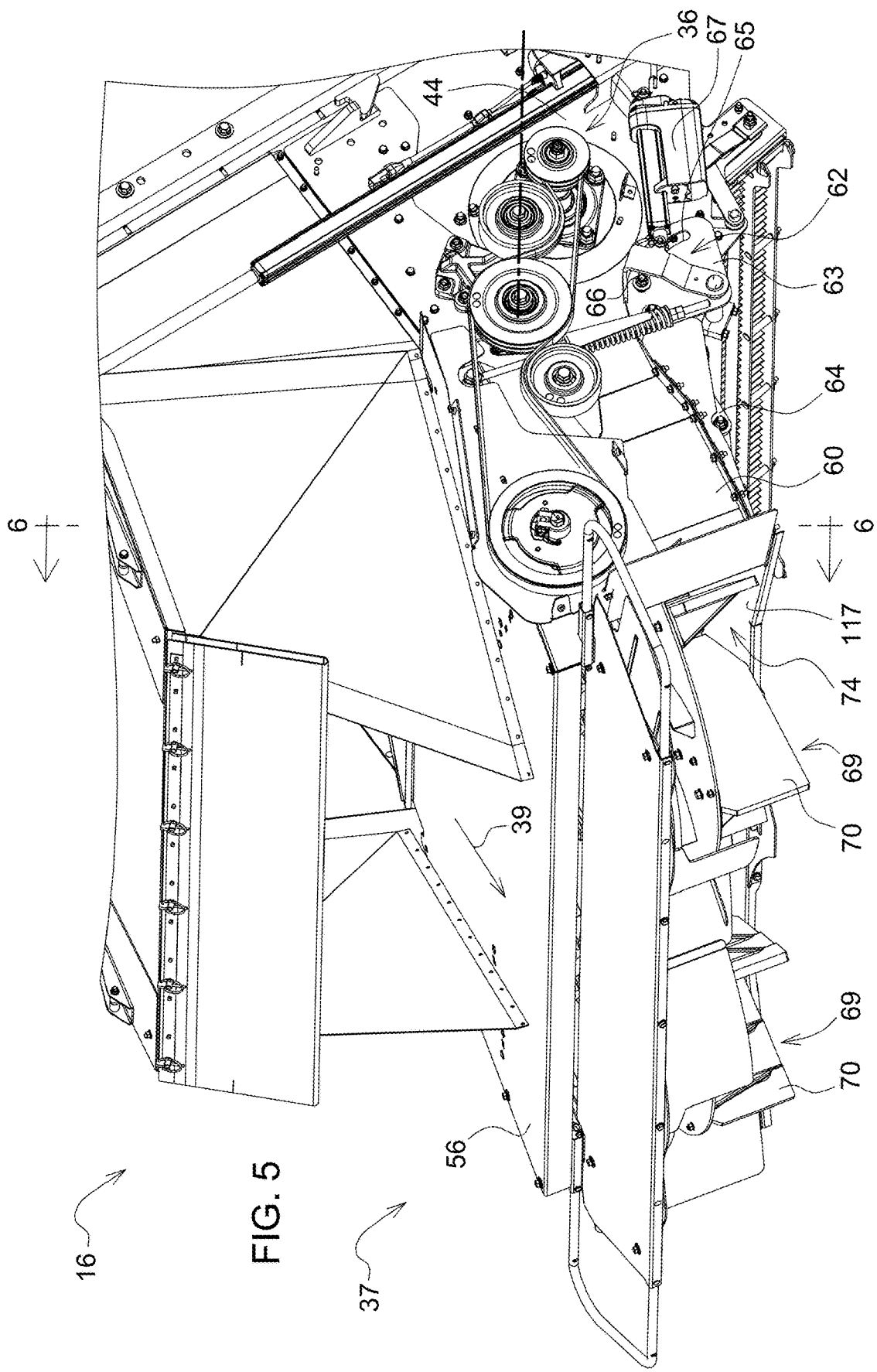
FIG. 5 is a rear perspective view showing the residue spreader positioned relative to the chopper in a windrow position to deposit crop residue onto the field in a windrow.
Figure 7:
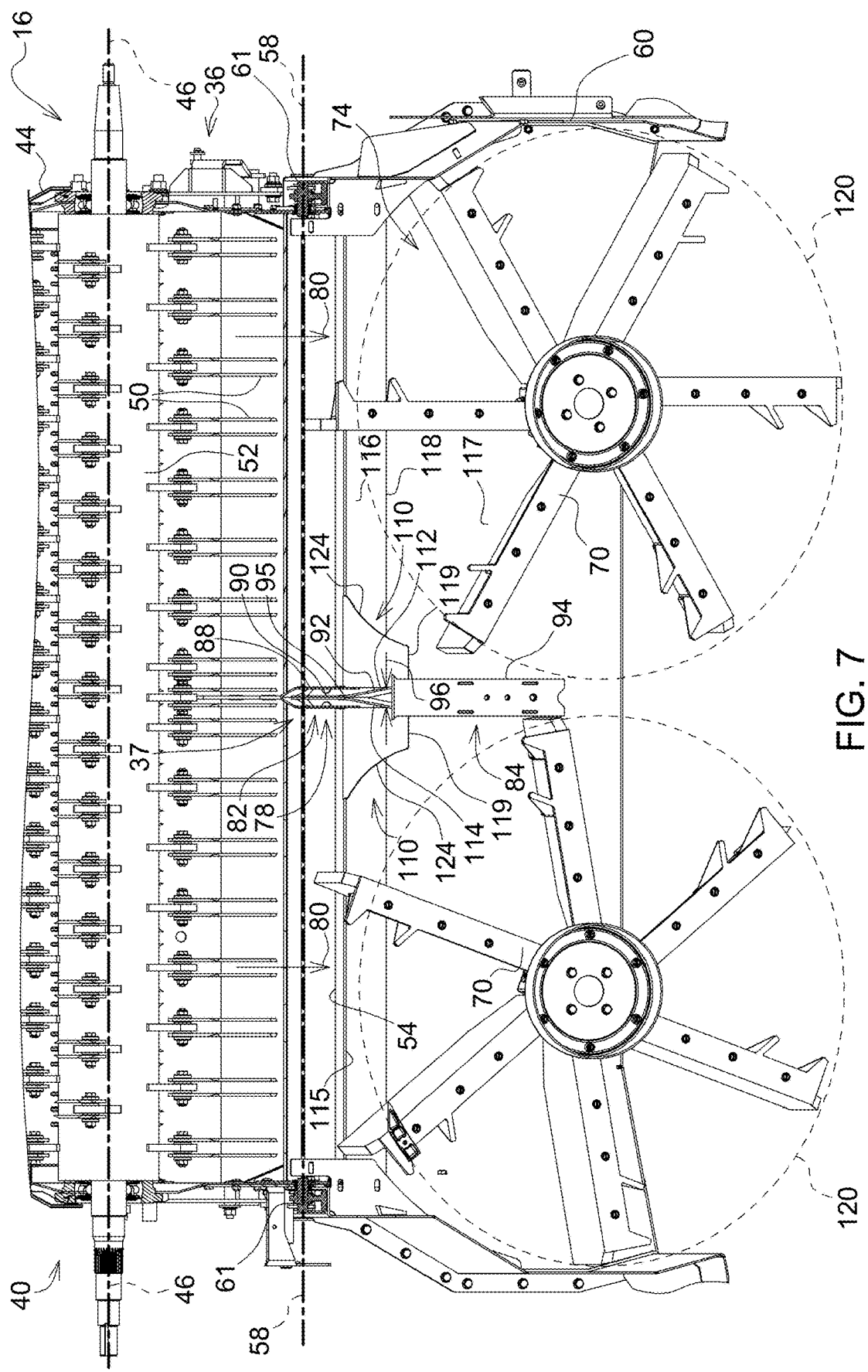
FIG. 7 is a top view, with portions broken away, showing the first and second floor extensions projecting rearwardly with the residue spreader in the windrow position.
Figure 8:
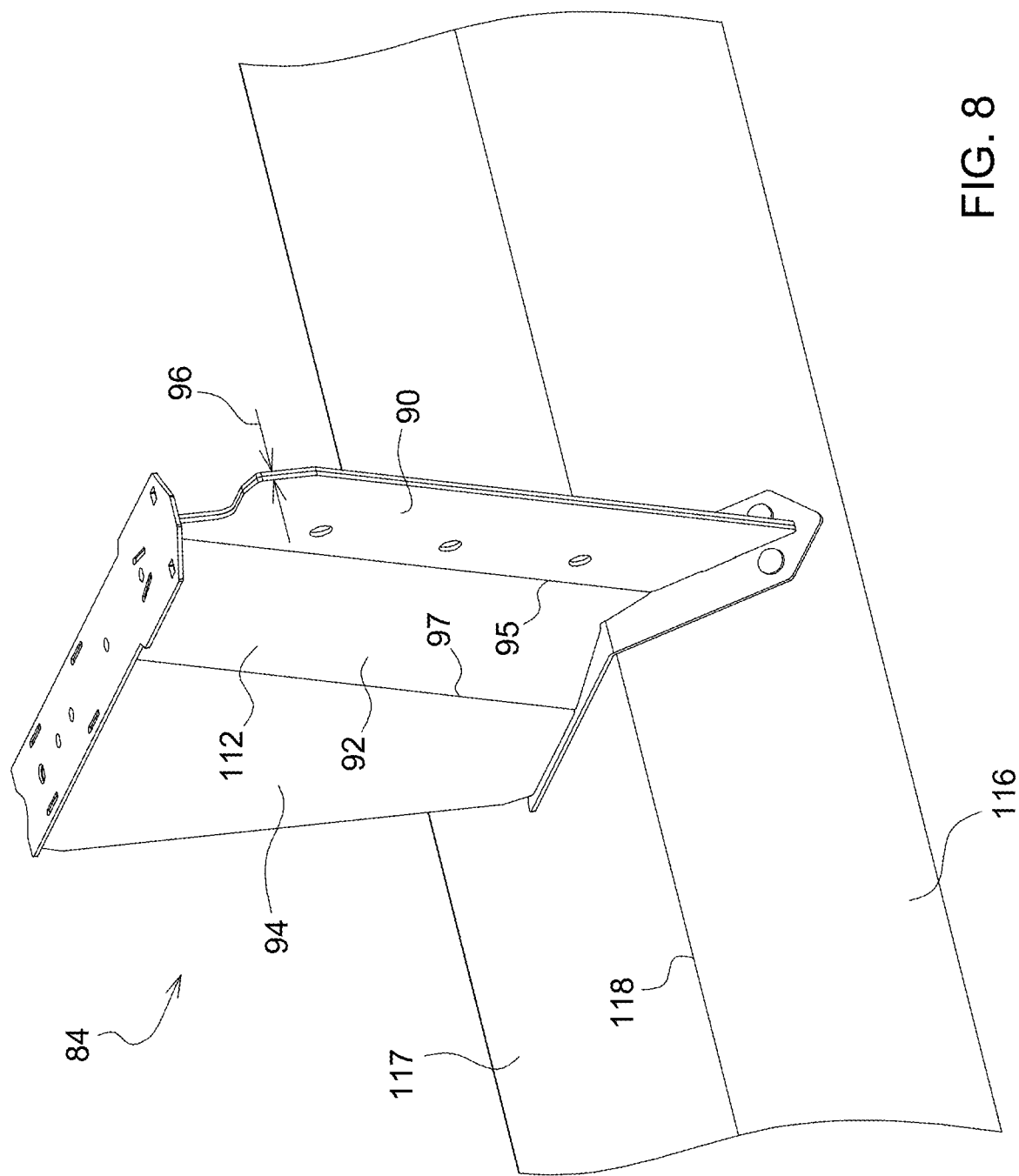
FIG. 8 is a front perspective view showing the rear splitter.

Referring to FIGS. 2-7, the residue spreader 37 is mounted to the frame 44 for pivotable movement about a pivot axis 58 between the dispersal position (FIGS. 2-4) and the windrow position (FIGS. 5-7). A frame 60 of the residue spreader 37 is mounted to the frame 44 of the chopper 36 (or other frame of the harvester 10) at a pivot joint 61 on the right side of the frame 44 of the chopper 36 and a corresponding pivot joint 61 on the left side of the frame 44 of the chopper 36.

Figure 2:
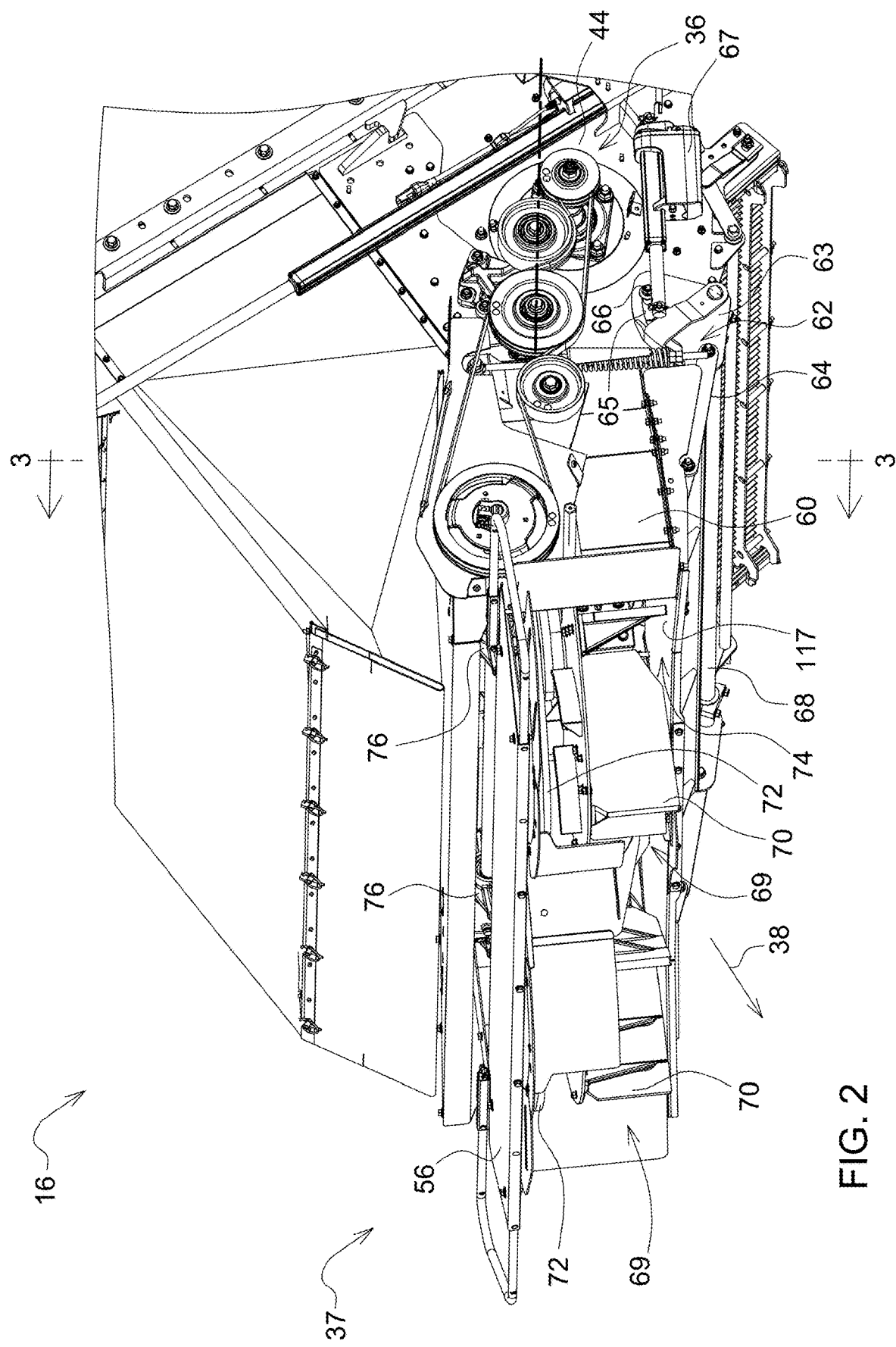
FIG. 2 is a rear perspective view showing a residue spreader of the residue management system positioned relative to a chopper of the residue management system in a dispersal position to disperse crop residue onto a field.

Referring to FIGS. 2 and 5, a linkage 62 on each of the right side of the chopper frame 44 and the left side of the chopper frame 44 interconnects the chopper frame 44 and the spreader frame 60. Each linkage 62 includes a crank 63 coupled pivotally to the chopper frame 36 and a link 64 coupled pivotally to the crank 63 and the spreader frame 60. Each crank 63 has an arcuate slot 65 in which a post 66 fixed to the chopper frame 36 is positioned to help guide pivotable movement of the crank 63 during actuation of the linkage 62.

An actuator 67 is positioned on one side of the chopper frame 36 (e.g., right side) and is coupled pivotally to the chopper frame 36 and the crank 63 on that side of the chopper frame 36 to actuate the linkage 62 that includes that crank 63. A connecting bar 68 is rotatably mounted to the chopper frame 36 and interconnects the cranks 63 of the linkages 62 such that actuation of the linkage 62 on the same side of the chopper frame 36 as the actuator 67 causes actuation of the other linkage 62. Extension and retraction of a rod of the actuator 67 actuates the linkage 62 on the same side of the chopper frame 36 as the actuator 67 and, via the connecting bar 68, the linkage 62 on the other side of the chopper frame 36 to pivot the residue spreader 37 between the dispersal and windrow positions. The residue spreader 37 may be pivoted in other ways.

Referring to FIGS. 2-7, the residue spreader 37 includes a first (right) spreading device 69 and a second (left) spreading device 69. Each spreading device 69 is configured to disperse crop residue onto the field 14. The spreading device 69 may be configured and operated in a wide variety of ways. For example, illustratively, the spreading device 69 includes an impeller 70 positioned between a ceiling 72 of the spreader 37 and a floor 74 of the spreader 37 and having a rotating disk and paddles depending therefrom for expelling crop residue from the residue spreader 37. The spreading device 69 includes a gearbox 76 that is mounted to the ceiling 72 and rotates the impeller 70. The gearbox 76 of the first spreading device 69 is driven by a belt powered by rotation of the flail rotor 40 of the chopper 36. A rotatable shaft interconnects the two gearboxes 76 to transmit power from the first gearbox 76 to the second gearbox 76 to rotate the impeller 70 of the second spreading device 69.

Referring to FIGS. 3-4 and 6-8, the chopper 36 and the residue spreader 37 cooperate to provide a flow splitter 78. The flow splitter 78 divides flow of crop residue chopped by the chopper 36 between the first and second spreading devices 69. The flow splitter 78 divides the flow of crop residue into a first stream 80 that flows to the first spreading device 69 and a second stream 80 that flows to the second spreading device 69.

The flow splitter 78 includes a front splitter 82 included in the chopper 36 and a rear splitter 84 included in the spreader 37. Each of the flow splitter 78, the front splitter 82, and the rear splitter 82 may be referred to simply as a "splitter."

The front splitter 82 includes a stationary central front knife 86 and a flow-dividing sheath 88. The front knife 86 is fixed to the floor 54 of the chopper 36 and cuts crop residue to promote dividing of flow of crop residue into the two streams 80 and prevent build-up of crop residue at the leading edge of the flow splitter 78. The sheath 88 expands in lateral width to further divide flow.

The rear splitter 84 is positioned laterally between the first and second spreading devices 69 to divide flow of crop residue from the chopper 36 between the first and second spreading devices 69. The rear splitter 84 includes a nose 90, a transition portion 92, and a rear portion 94. The transition portion 92 extends rearwardly from the nose 90 to the rear portion 94 such that the transition portion 92 is positioned between the nose 90 and the rear portion 94 relative to a fore-aft dimension of the harvester 10 and system 16.

The rear splitter 84 includes, for example, a pair of side walls, a top wall on top of the side walls so as to be coupled thereto (e.g., welded), and a bottom wall on the bottom of the side walls so as to be coupled thereto (e.g., welded). The side walls are flush against and coupled to (e.g., welded) one another to provide the nose 90. Proceeding rearwardly, the side walls begin to diverge from one another at a forward margin 95 of the transition portion 92, such that the transition portion 92 expands in lateral width 96 in laterally opposite directions as the transition portion 92 extends rearwardly. The forward margin 95 is provided by a bend in the side walls. In the rear portion 94 of the rear spitter 84, the side walls extend rearwardly from a rearward margin 97 of the transition portion 92 in parallel to one another. The rearward margin 97 is provided a bend in the side walls. The two side walls are vertical, although in other embodiments they may be inclined.

The nose 90 projects forwardly from the forward margin 95 into the sheath 88 of the chopper 36. The sheath 88 opens rearwardly to receive the nose 90 such that the nose 90 is positioned in the sheath 88 in the dispersal and windrow positions.

Referring to FIGS. 3-4 and 6-7, the residue spreader 37 includes the floor 74. The floor 74 is positioned under the first and second spreading devices 69. The floor 54 of the chopper 36 and the floor 74 of the residue spreader 37 are spaced apart from one another to define a gap 98 therebetween. The gap 98 facilitates pivotable movement of the residue spreader 37 between the dispersal position and the windrow position.

Referring to FIGS. 3-4, 6-7, and 9-10, the residue management system 16 includes one or more floor extensions 110 to guide flow of crop residue from the chopper 36 to the residue spreader 37. Illustratively, the residue management system 16 includes a first (right) floor extension 110 and a second (left) floor extension 110. Each floor extension 110 projects rearwardly from the floor 54 of the chopper 36 partially over the floor 74 of the residue spreader 37 about the gap 98 alongside the flow splitter 78 to guide flow of crop residue from the chopper 36 to the residue spreader 37. The first flow extension 110 guides flow of crop residue to the first spreading device 69, and the second flow extension 110 guides flow of crop residue to the second spreading device 69.

The floor extensions 110 are positioned on laterally opposite sides of the flow splitter 78. The first floor extension 110 is positioned on a first (right) lateral side 112 of the front splitter 82 and the rear splitter 84, and the second floor extension 110 is positioned on an opposite, second (left) lateral side 114 of the front splitter 82 and the rear splitter 84.

The floor extensions 110 project rearwardly alongside the front splitter 82 and the rear splitter 84. The floor extensions 110 project rearwardly alongside the sheath 88 and the nose 90. The first and second floor extensions 110 are, for example, cantilevered from a rear edge 115 of the chopper floor 54 adjacent the sheath 88 on the first and second lateral sides 112, 114 of the sheath 88, respectively.

Referring to FIGS. 3 and 6, as viewed in side elevation with respect to the first floor extension 110, with the second floor extension 110 being a mirror thereof, the floor extensions 110 project rearwardly to the transition portion 92 as viewed in side elevation. The first floor extension 110 projects rearwardly on the first lateral side 112 of the rear splitter 84 to the transition portion 92. The second floor extension 110 projects rearwardly on the second lateral side 114 of the rear splitter 84 to the transition portion 92. The first and second floor extensions 110 project rearwardly at least to the forward margin 95 of the transition portion 92. The floor extensions 110 terminate at the forward margin 95 on the first and second lateral sides 112, 114 of the rear splitter 84, respectively, when the residue spreader 37 is positioned in the dispersal position (FIG. 3). The floor extensions 110 project rearwardly past the forward margin 95 alongside the transition portion 92 on the first and second lateral sides 112, 114 of the rear splitter 84, respectively, when the residue spreader 37 is positioned in the windrow position (FIG. 6).

Referring to FIGS. 3-4 and 6-7, the first and second floor extensions 110 project rearwardly over an inclined front panel 116 of the spreader floor 74. The front panel 116 is inclined so as to extend upwardly as the front panel 116 extends rearwardly to facilitate pivotable movement of the residue spreader 37 between the dispersal position and the windrow position. The front panel 116 is positioned in front of a main panel 117 of the spreader floor 74, and is angled from the main panel 116 to define a lateral bend 118 therebetween to facilitate such pivotable movement. The first and second floor extensions 110 project over the front panel 116 as the first and second floor extensions 110 project alongside the transition portion 92 on the first lateral side 112 of the rear splitter 84 and the second lateral side 114 of the rear splitter 84, respectively, when the residue splitter 37 is positioned in the windrow position.

Each of the floor extensions 110 includes a rearwardmost tip 119. The tip 119 is higher than the bend 118 to facilitate flow of crop residue past the front panel 116 to the respective spreading device 69.

Referring to FIGS. 4 and 7, the impeller 70 of each spreading device 69 has a rotation profile 120. The rotation profile 120 corresponds to the outer diameter of the spreading device 69. The first floor extension 110 is positioned outside the rotation profile 120 of the impeller 70 of the first spreading device 69 to avoid interference with that impeller 70, and projects rearwardly between the rotation profile 120 of that impeller 70 and the first lateral side 112 of the transition portion 92 of the rear splitter 84 when the residue spreader 37 is positioned in the windrow position. The second floor extension 110 is positioned outside the rotation profile 120 of the impeller 70 of the second spreading device 69 to avoid interference with that impeller 70, and projects rearwardly between the rotation profile 120 of that impeller 70 and the second lateral side 114 of the transition portion 92 of the rear splitter 84 when the residue spreader 37 is positioned in the windrow position.

Referring to FIGS. 4, 7, and 9-11, the first and second floor extensions 110 taper in lateral width 122 as the first and second floor extensions 110 project rearwardly. Such tapering avoids interference with rotation of the spreading devices 69 when the residue spreader 37 is positioned in the windrow position. The first floor extension 110 tapers as the first floor extension 110 projects rearwardly between the transition portion 92 and the rotation profile 120 of the impeller 70 of the first spreading device 69 over the inclined front panel 116 alongside the transition portion 92 in the windrow position of the residue spreader 37. Similarly, the second floor extension 110 tapers as the second floor extension 110 projects rearwardly between the transition portion 92 and the rotation profile 120 of the impeller 70 of the second spreading device 69 over the inclined front panel 116 alongside the transition portion 92 in the windrow position of the residue spreader 37.

Each of the floor extensions 110 includes a laterally outer concave edge 124. Such concave edge 124 helps avoid interference with rotation of the respective spreading device 69 when the residue spreader 37 is positioned in the windrow position. The concave edge 124 of the first floor extension 110 corresponds to the rotation profile 120 of the impeller 70 of the first spreading device 69. The concave edge 124 of the second floor extension 110 corresponds to the rotation profile 120 of the impeller 70 of the second spreading device 69.

Each of the floor extensions 110 has a shape corresponding to the transition portion 92 to accommodate when the floor extension 110 extends alongside the transition 92 in windrow position of the residue spreader 37. The floor extension 110 includes a laterally inner chamfered edge 126 angling with the transition portion 92 such that the chamfered edge 126 is parallel to the respective lateral side 112, 114 of the transition portion 92.

Referring to FIGS. 5, 10, and 11, each floor extension 110 includes a mounting portion 128 and a projecting portion 130. The mounting portion 128, configured, for example, as a flange, is coupled to the rear edge 115 of the chopper frame 44. The mounting portion 128 may be so coupled in a wide variety of ways. Illustratively, the mounting portion 128 is so coupled with a pair of fasteners 132. Each fastener 132 may include a bolt extending through a respective aperture 134 of the mounting portion 128, a nut threaded to the bolt, and a washer positioned between the nut and the mounting portion 128.

The projecting portion 130 is the portion of the floor extension that projects rearwardly to guide crop residue from the chopper 36 to the residue spreader 37. The projecting portion 130 includes the tip 119, the concave edge 124, and the chamfered edge 126. The projecting portion 130 includes an upper face 136 facing upwardly that guides crop residue from the chopper 36 to the residue spreader 37.

The floor extensions 110 may help reduce potential stagnation of crop residue flow and corresponding crop residue build-up. The floor extensions 110 may help reduce such potential stagnation and build-up on the front panel 116 near the flow splitter 78, particularly near the rear splitter 84 including in the vicinity of the forward margin 95 thereof, on opposite lateral sides 112, 114.

While the above describes example embodiments of the present disclosure, these descriptions should not be viewed in a limiting sense. Rather, other variations and modifications may be made without departing from the scope and spirit of the present disclosure as defined in the appended claims.

What is claimed is:

1. A residue management system for an agricultural harvester that moves in a forward direction of travel over a field to harvest crop, comprising:
   a chopper to chop crop residue derived from crop harvested from the field by the agricultural harvester, the chopper comprising a floor,
   a residue spreader mounted for pivotable movement relative to the chopper between a dispersal position to disperse crop residue received from the chopper onto the field and a windrow position to deposit crop residue received from the agricultural harvester onto the field in a windrow, the residue spreader comprising a first spreading device, a second spreading device, a splitter positioned laterally between the first spreading device and the second spreading device to divide flow of crop residue from the chopper between the first spreading device and the second spreading device, and a floor under the first spreading device and the second spreading device, the floor of the chopper and the floor of the residue spreader spaced apart from one another to define a gap therebetween to facilitate pivotable movement of the residue spreader between the dispersal position and the windrow position, and
   a floor extension projecting rearwardly from the floor of the chopper partially over the floor of the residue spreader about the gap alongside the splitter to guide flow of crop residue from the chopper to the residue spreader.

2. The residue management system of claim 1, wherein the splitter comprises a nose projecting forwardly from a forward margin into a flow-dividing sheath of the chopper, and the floor extension projects rearwardly alongside the sheath and the nose.

3. The residue management system of claim 2, wherein the floor extension is cantilevered from a rear edge of the floor of the chopper adjacent the flow-dividing sheath.

4. The residue management system of claim 1, wherein the splitter comprises a transition portion expanding in lateral width as the transition portion extends rearwardly, and the floor extension projects rearwardly at least to a forward margin of the transition portion as viewed in side elevation.

5. The residue management system of claim 4, wherein the floor extension terminates rearwardly at the forward margin of the transition portion as viewed in side elevation when the residue spreader is positioned in the dispersal position.

6. The residue management system of claim 4, wherein the floor extension projects rearwardly past the forward margin of the transition portion alongside the transition portion as viewed in side elevation when the residue spreader is positioned in the windrow position.

7. The residue management system of claim 4, wherein the floor extension comprises a laterally inner chamfered edge.

8. The residue management system of claim 4, wherein the floor of the residue spreader comprises a front panel inclined so as to extend upwardly as the front panel extends rearwardly to facilitate pivotable movement of the residue spreader between the dispersal position and the windrow position, and the floor extension projects over the inclined front panel as the floor extension projects alongside the transition portion when the residue spreader is positioned in the windrow position.

9. The residue management system of claim 1, wherein the first spreading device comprises an impeller having a rotation profile, and the floor extension tapers in lateral width as the floor extension projects rearwardly between the rotation profile and the splitter.

10. The residue management system of claim 9, wherein the floor extension comprises a concave edge corresponding to the rotation profile.

11. The residue management system of claim 1, wherein the floor of the residue spreader comprises an inclined front panel over which the floor extension projects rearwardly.

12. The residue management system of claim 11, wherein the floor of the residue spreader comprises a main panel, the front panel is positioned in front of and angled from the main panel to define a bend therebetween, and the floor extension comprises a rearwardmost tip higher than the bend.

13. The residue management system of claim 1, comprising a second floor extension projecting rearwardly from the floor of the chopper partially over the floor of the residue spreader about the gap alongside the splitter to guide flow of crop residue from the chopper to the residue spreader.

14. The residue management system of claim 13, wherein the floor extension is positioned on a first lateral side of the splitter, and the second floor extension is positioned on an opposite, second lateral side of the splitter.

15. The residue management system of claim 14, wherein the splitter comprises a transition portion expanding in lateral width in laterally opposite directions as the transition portion extends rearwardly, the floor extension projects rearwardly on the first lateral side of the splitter to the transition portion as viewed in side elevation, and the second floor extension projects rearwardly on the second lateral side of the splitter to the transition portion as viewed in side elevation.

16. The residue management system of claim 13, wherein the floor comprises an inclined front panel over which the floor extension and the second floor extension project rearwardly.

17. The residue management system of claim 13, wherein the floor extension tapers in lateral width as the floor extension projects rearwardly, and the second floor extension tapers in lateral width as the second floor extension projects rearwardly.

* * * * *